United States Patent [19]

Aoki

[11] 4,165,711

[45] Aug. 28, 1979

[54] FISH-GATHERING BLOCK

[76] Inventor: Koichiro Aoki, Asano 2381, Kagawa-cho, Kagawa-gun, Kagawa-ken, Japan

[21] Appl. No.: 802,443

[22] Filed: Jun. 1, 1977

[30] Foreign Application Priority Data

Jun. 7, 1976 [JP] Japan .................................. 51-66739
Jul. 17, 1976 [JP] Japan .................................. 51-85235
Sep. 29, 1976 [JP] Japan .................................. 51-117653

[51] Int. Cl.² ............................................ A01K 61/00
[52] U.S. Cl. ...................................................... 119/3
[58] Field of Search .......................... 119/3, 2, 4; 61/4

[56] References Cited

U.S. PATENT DOCUMENTS 3,898,958  8/1975  Pranis, Jr. .................................. 119/3

FOREIGN PATENT DOCUMENTS 43-14399  6/1968  Japan .......................................... 119/3

Primary Examiner—Louis G. Mancene
Assistant Examiner—Daniel J. Leach
Attorney, Agent, or Firm—Blanchard, Flynn, Thiel, Boutell & Tanis

[57] ABSTRACT

A fish-gathering block comprising a plurality of supports erected on a base frame and supporting an upper structure. The current flows through an opening between the lower end of the upper structure and the base frame. This flowthrough opening prevents the sinking of the fish-gathering block into the sea-bottom by eliminating or materially weakening the ocean-current's excavating action.

17 Claims, 23 Drawing Figures

FIG. IA
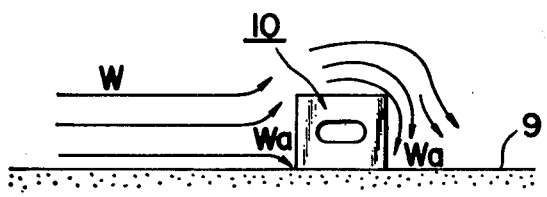
FIG. IB
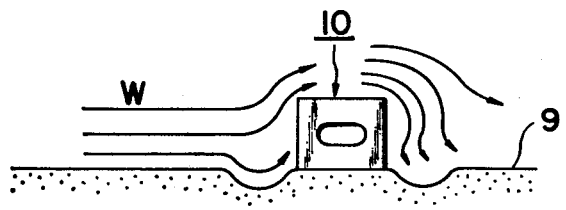
FIG. IC
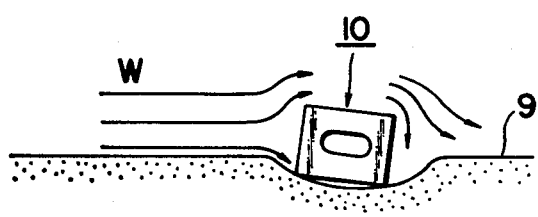
FIG. ID
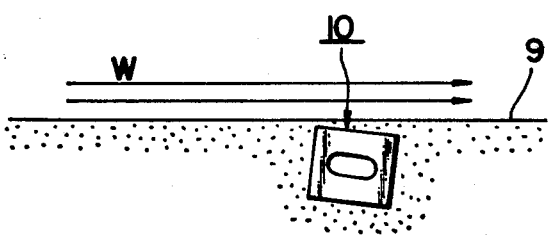

FISH-GATHERING BLOCK

FIELD OF THE INVENTION

This invention relates to a fish-gathering block that forms, when sunk in large quantities, an artificial fish shelter at the sea-bottom. More particularly, it relates to a prefabricated fish-gathering block.

BACKGROUND OF THE INVENTION

Fish-gathering blocks of various types (box-shaped and cylindrical, for instance) have heretofore been used to form artificial fish shelters. The conventional blocks have been apt to sink in the sea-bottom in a short period of time after installation under the action of ocean-currents known as scouring. For instance, a conventional box-shaped block is exemplified in FIGS. 1A through 1D. When a current W impinges on a fish-gathering block 10 at the sea-bottom, that portion of the current which flows in the vicinity of the lower part of the block 10 becomes deflected downward. This deflected current $W_a$ then excavates the earth and sand around the block 10. After some time, the block 10 may overturn or, otherwise, sink in the sea-bottom 9 as shown in FIG. 1D, thus losing the function of the fish-gathering block.

The object of this invention is to provide such a fish-gathering block of new design which is capable of solving the aforementioned problems as experienced with conventional blocks, which is superb in fish-gathering effect, and which is easy to manufacture, transport and install.

Being mostly of large size, conventional one-piece fish-gathering blocks are difficult to manufacture, transport and install on the sea-bottom. Such difficulties are obviated by dividing each block into several elemental members and assembling such members where the block is to be installed.

BRIEF DESCRIPTION OF THE DRAWINGS

FIGS. 1A through 1D illustrate the operation of a conventional fish-gathering block in the current at the sea-bottom.

DETAILED DESCRIPTION

Figure 2:
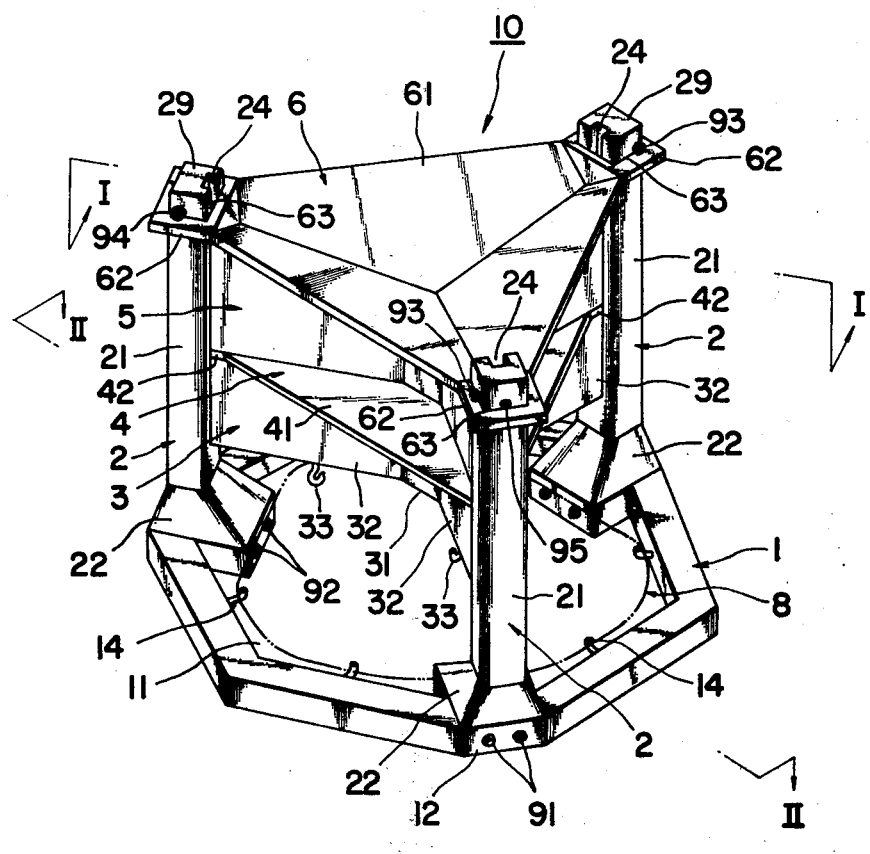
FIG. 2 is a perspective view of a fish-gathering block embodying this invention.
Figure 3:
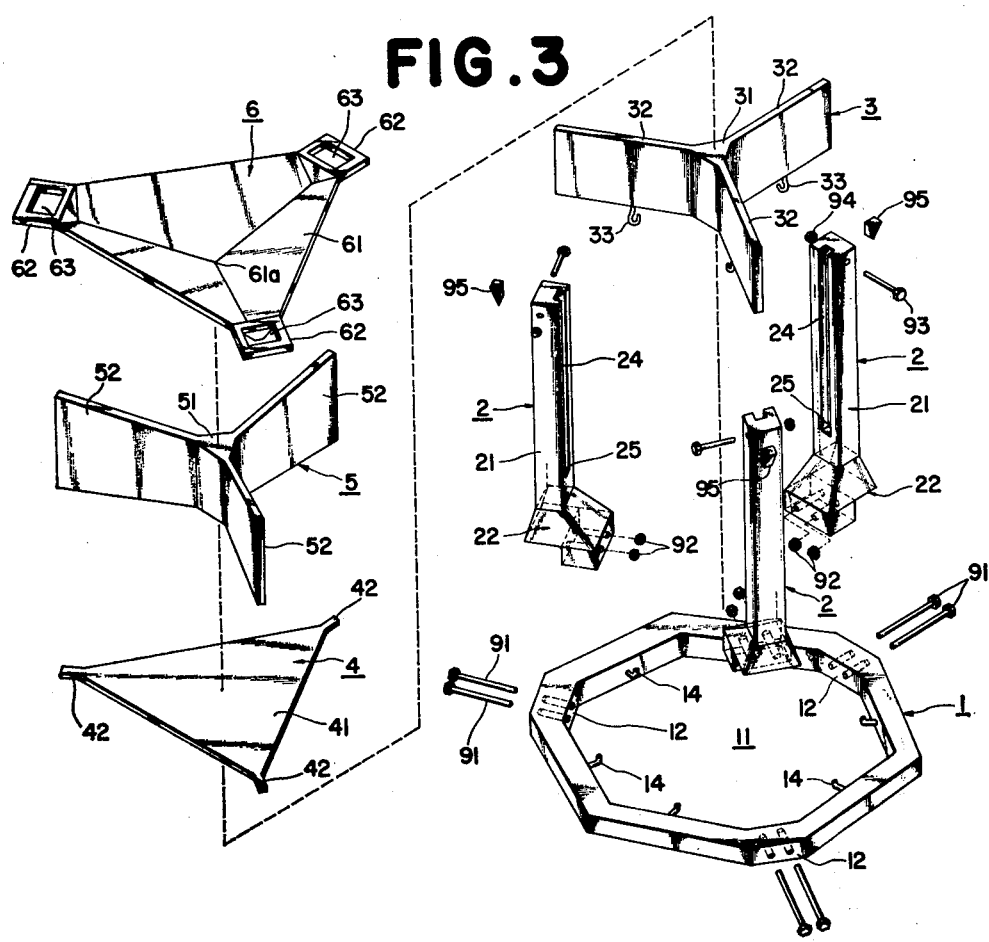
FIG. 3 is an exploded view of the fish-gathering block of FIG. 2.

A prefabricated fish-gathering block 10, as shown in FIGS. 2 and 3, comprises such elemental members as a substantially regular-hexagonal base frame 1, three supports 2, a lower vertical wall unit 3, a shelf 4, an upper vertical wall unit 5 and a ceiling plate 6, all made of reinforced concrete.

The base frame 1 has three support seats 12, formed at equal intervals. Each support 2 has an L-shaped base 22 at the lowest end of its main part 21. The support 2 is erected on the base frame 1 by matching said base 22 with the seat 12 of the base frame 1 and fastening them together with bolts 91 and nuts 92.

Figure 4:
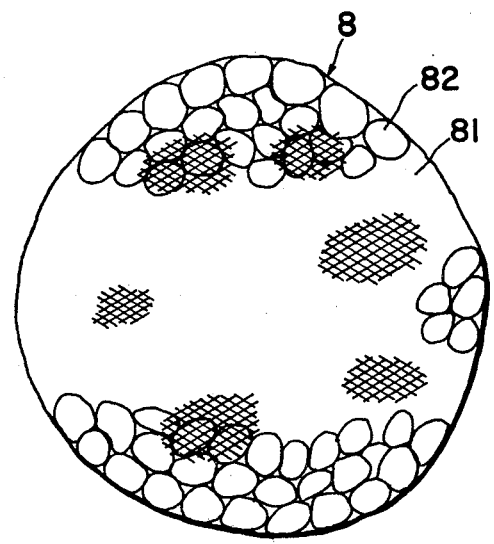
FIG. 4 is a plan view of a stone-filled net bag.

A suitable number of hooks 14 are implanted on the inside 11 of the base frame 1 to hold a stone-filled net bag 8, as shown in FIG. 4, which bag prevents the floating of earth and sand from the sea bottom as described hereinafter. The stone-filled net bag 8 comprises a wire-net bag 81 filled with many cobblestones or other suitable weights 82.

The internal surface of each support 2 is formed with a vertical groove 24, and the groove bottom 25 terminates at a suitable height above the base 22.

The lower vertical wall unit 3 is Y-shaped, comprising a core 31 and three projecting vertical walls 32 spaced apart at equal angles. At the lowest end of each wall 32 is implanted a hook 33 to hold a wire 83 (FIG. 5) for suspending the stone-filled net bag 8.

The shelf 4 is a substantially regular-triangular plate 41 formed with projections 42 at the individual apexes. Each projection 42 is adapted to engage with the groove 24 in the respective support 2.

Like the lower vertical wall unit 3, the upper vertical wall unit 5 is Y-shaped, comprising a core 51 and three projecting vertical walls 52 spaced apart at equal angles.

The ceiling plate 6 comprises a substantially regular-triangular main part 61, which dips toward the center 61a and has engaging projections 62 at the three apexes. Each projection 62 has an opening 63 to receive the head 29 of the support 2.

These elemental members are assembled together as follows: the base 22 of each support 2 is placed and fixed on the respective support seat 12 of the base frame 1, as by means of bolts 91 and nuts 92, so that the vertical grooves 24 on the three supports 2 all face toward the center. Into the vertical grooves 24 of the three supports 2 are slid from above the lower vertical wall unit 3, the shelf 4 and the upper vertical wall unit 5 in that order. Then, finally, the ceiling plate 6 is mounted so that the support heads 29 fit in the openings 63 in its engaging projections 62. Then, the lowest end of the lower vertical wall unit 3 is held flush with the bottoms 25 of the vertical grooves 24, thus leaving an opening 71 therebelow through which the current flows as described hereinafter.

Next, a wedge 95 is driven into a space between the opening 63 in the projection 62 and the support head 29 to prevent their jolting. To prevent the disengagement of the ceiling plate 6, a bolt 93 is passed through the support head 29 directly above the projection 62 and is fixed with a nut 94.

The assembling of these elemental members may be effected at the site where the fish-gathering block is to be installed. Further, the stone-filled net bag 8 may be positioned on the inside of the base frame 1 in the final stage of assembling, if required, depending on the type of sea-bottom soil.

Figure 5:
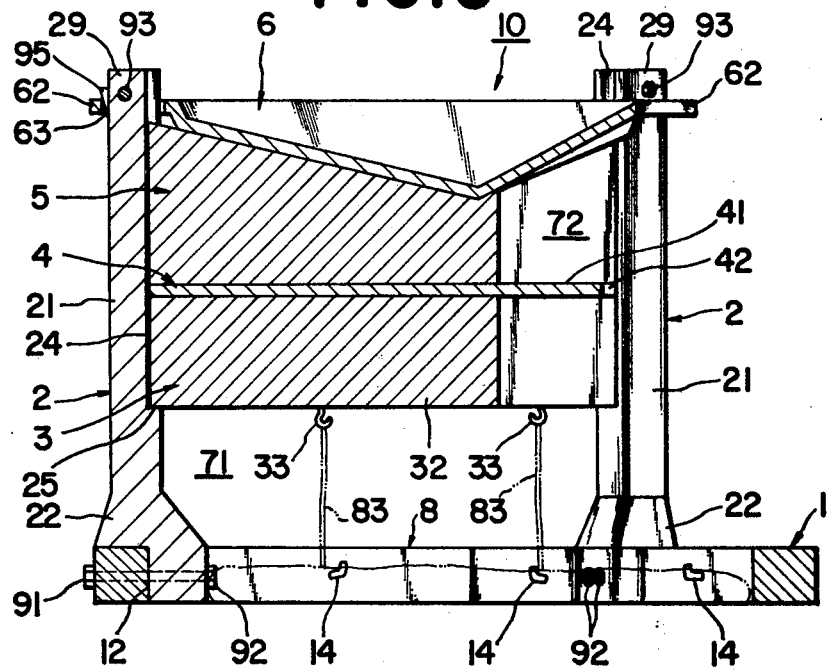
FIG. 5 is a cross-sectional view taken along the line I—I of FIG. 2.
Figure 6:
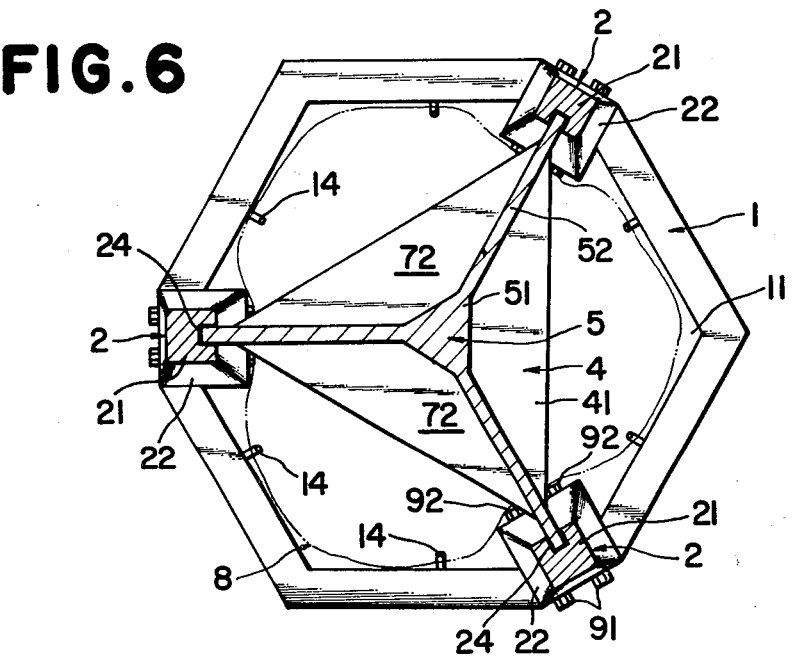
FIG. 6 is a cross-sectional view taken along the line II—II of FIG. 2.

In FIGS. 5 and 6, reference numeral 72 designates spaces defined between the vertical walls of the vertical wall units 3 and 5 and between the shelf 4 and the ceiling plate 6.

Figure 7:
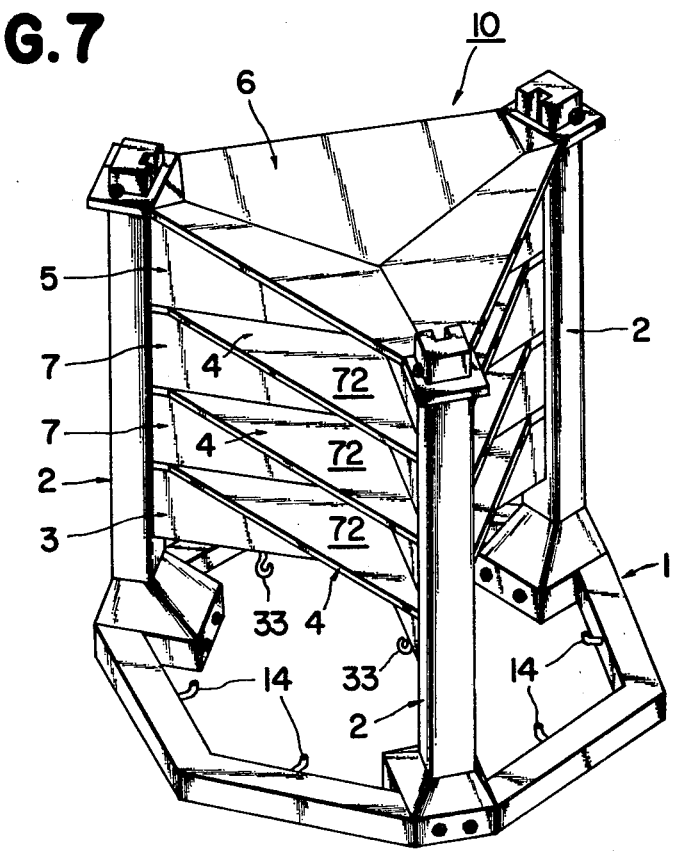
FIG. 7 is a perspective view of another fish-gathering block embodying this invention.

FIG. 7 illustrates another embodiment of this invention. This fish-gathering block 10 has longer supports 2 than in the embodiment of FIG. 1. Further, three shelves 4 and two intermediate vertical wall units 7 (of the same shape as the lower vertical wall unit 3) are alternately interposed between the lower vertical wall unit 3 and the upper vertical wall unit 5. In other respects, it is identical with the embodiment of FIG. 1.

As will be understood from the above, this invention permits manufacturing various sizes of fish-gathering blocks by suitably selecting the length of the supports 2 and the number of the intermediate vertical wall units 7 and shelves 4.

OPERATION

Figure 8A:
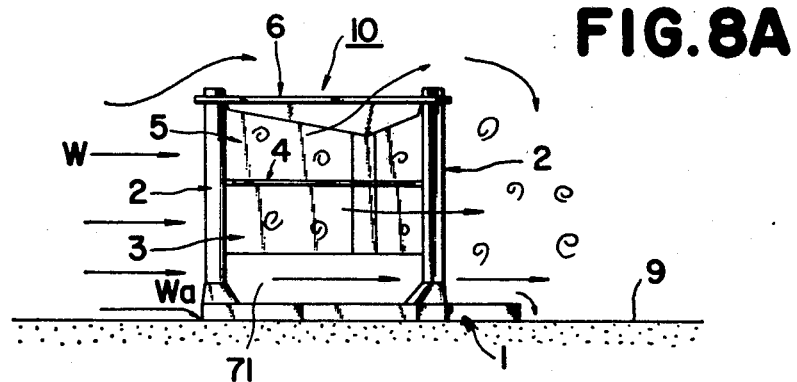
FIGS. 8A through 8C illustrate the operation of the fish-gathering block of FIG. 1 at the sea-bottom.
Figure 8B:
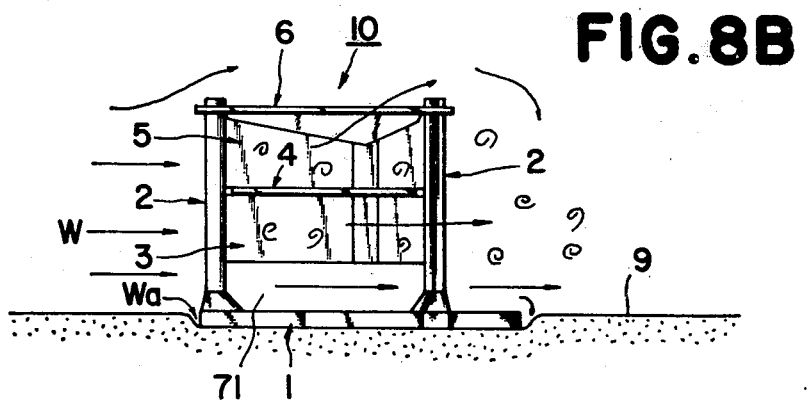
Figure 8C:
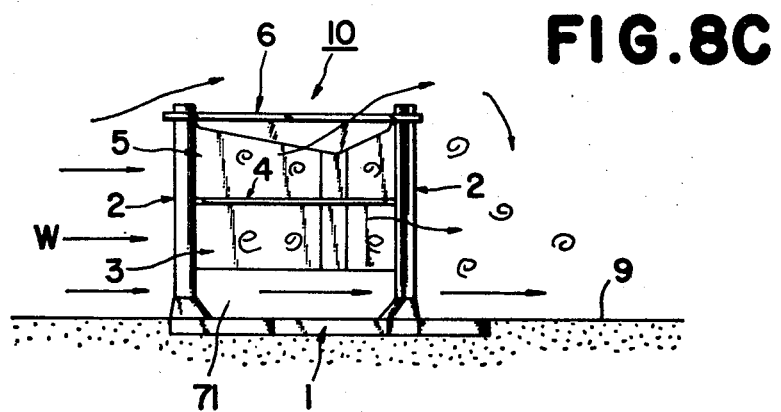

The operation of the above-described fish-gathering blocks of this invention will be explained by reference to FIGS. 8A through 8C.

The fish-gathering block 10 is lowered to the sea-bottom by the crane of a ship. Immediately after installation, the block 10 rests on the surface of the sea-bottom 9, as shown in FIG. 8A. When a (deflected) portion $W_a$ of the current W strikes the front of the base frame 1 of the block 10, the earth and sand around the base frame 1 begins to be excavated, as illustrated in FIG. 8B. Then, ultimately, only the base frame 1 of the block 10 sinks in the sea-bottom 9, as shown in FIG. 8C. Thereafter, the current W coming to the lower part of the block 10 flows through the opening 71 formed between the lower vertical wall unit 3 and the base frame 1, and, consequently, the current W practically discontinues to excavate the sea-bottom 9. Therefore, the block 10 stably performs its function as the fish-gathering shelter for a long time, without further sinking or overturning.

Where the sea-bottom 9 is very soft, the stone-filled net bag 8 may be provided in the space 11 inside the base frame 1 of the block 10. The bag 8 prevents the floating of earth and sand by the current W passing through the opening 71.

In the fish-gathering block 10, the vertical walls of each vertical wall unit are joined together in the shape of Y, with their top covered with the ceiling plate 6. Therefore, when the current W strikes the block 10, it produces a great current-checking effect. As a consequence, a large whirlpool (Karman's vortex effect) is generated in its vicinity (especially in the downstream area of the current), which facilitates the stay of such fish feeds as plankton and fingerlings.

Further, the illustrated fish-gathering block 10 contains many shaded spaces 72 between the walls for which many fishes (especially bottom fishes) have a liking. Also, the block 10, being made of concrete, readily gathers shellfishes and seaweeds, which attract fishes, in a short time after installation. In this connection, application of steel powder on the surface of the concrete walls making up the block 10 accelerates the growth of such shellfishes and seaweeds.

Figure 9:
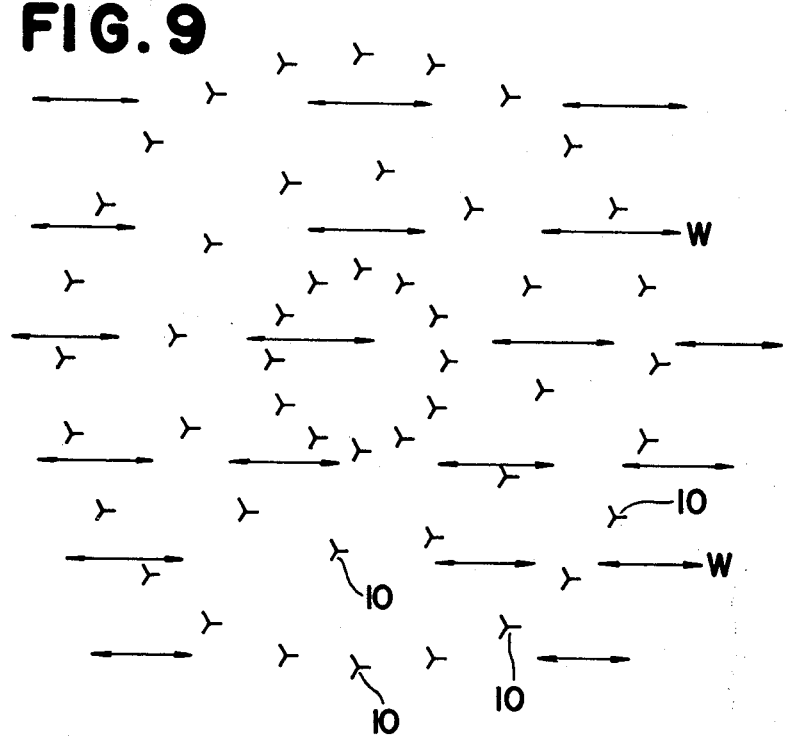
FIGS. 9 and 10 exemplify the arrangements of the fish-gathering blocks according to this invention.
Figure 10:
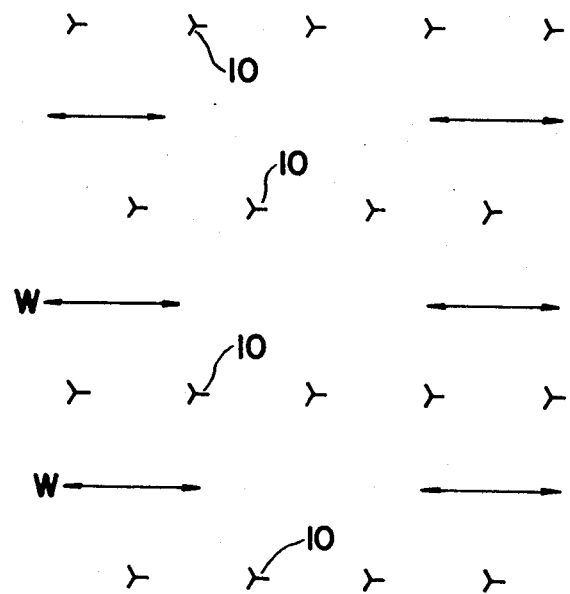

FIGS. 9 and 10 exemplify arrangements at the sea-bottom of the fish-gathering blocks 10 according to this invention. In FIG. 9, the blocks 10 are placed in many concentric circles. This arrangement is suited for angling. In FIG. 10, the blocks 10 are linearly placed, parallel with the direction of the current, so that a fishing net may be drawn between the rows of the blocks.

Figure 11:
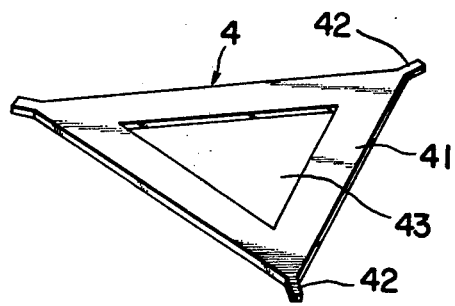
FIG. 11 is a perspective view of a shelf with a flow-through opening.
Figure 12:
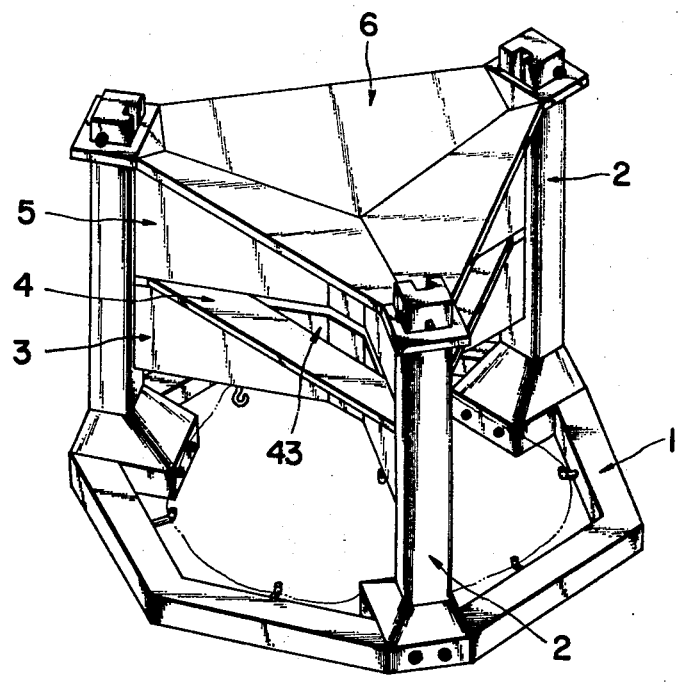
FIG. 12 is a perspective view of a fish-gathering block employing the shelf of FIG. 11.
Figure 13:
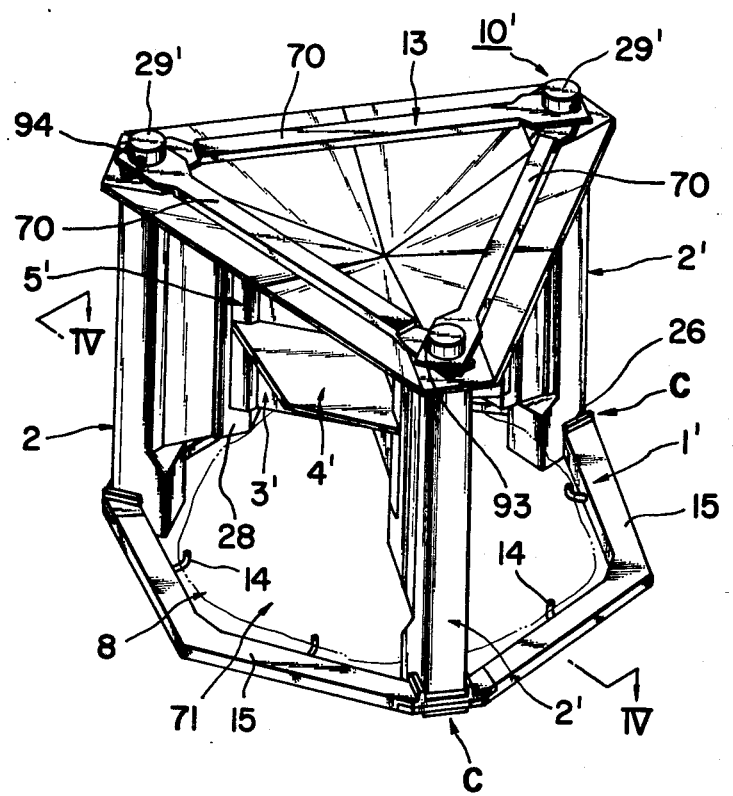
FIG. 13 is a perspective view of still another fish-gathering block embodying this invention.
Figure 14:
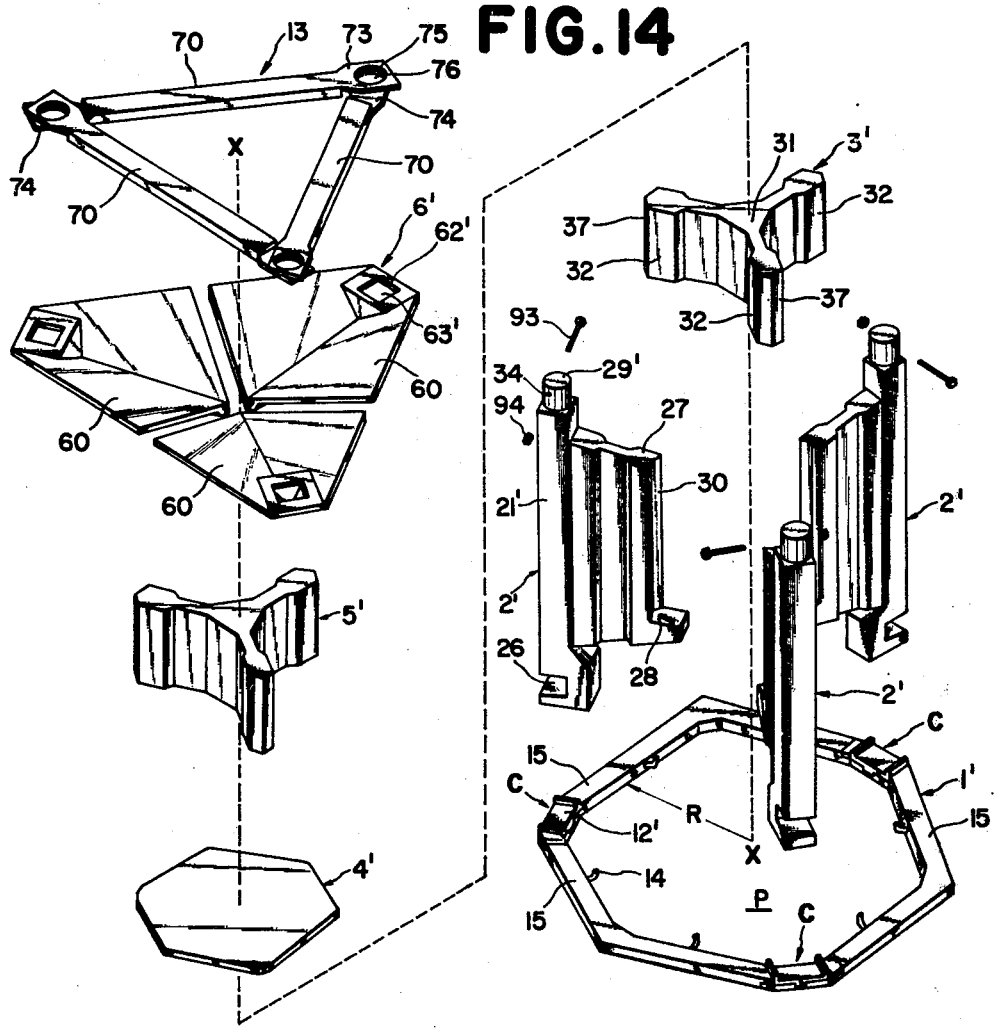
FIG. 14 is an exploded view of the fish-gathering block of FIG. 13.
Figure 15:
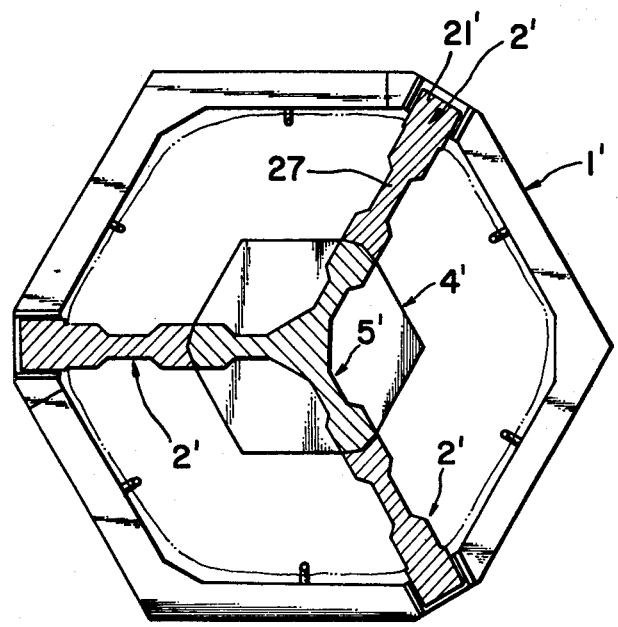
FIG. 15 is a cross-sectional view taken along the line IV—IV of FIG. 13.

FIGS. 11 and 12 illustrate a variation of the fish-gathering block 10 wherein the shelf 4 is provided with an opening 43 therein. When the fish-gathering block is placed at the sea-bottom for a long time, fish bones, shells and dusts may accumulate on the shelf 4, thereby reducing the living space of the fishes. The shelf 4, when provided with the opening 43 as employed in this embodiment, prevents such accumulation.

MODIFICATIONS

Now an embodiment shown in FIGS. 13 through 16 will be described. Like the embodiment illustrated in FIG. 2, this embodiment of the block 10' also comprises a base frame 1', three supports 2', a lower vertical wall unit 3', a shelf 4', an upper vertical wall unit 5' and a ceiling plate 6'.

Figure 16:
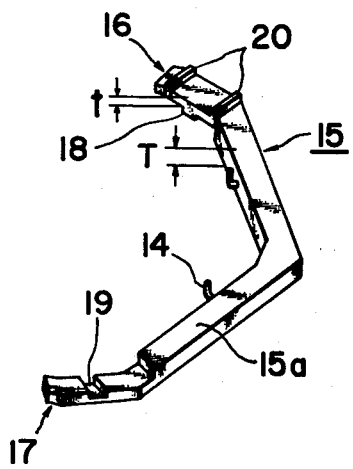
FIG. 16 is a perspective view of a divided frame piece.

As illustrated in FIG. 16, the base frame 1' comprises three V-shaped frame pieces 15, each of which has an upper engaging section 16 at one end and a lower engaging section 17 at the other. The three frame pieces are joined together to form a regular-hexagonal ring (having a radius R between the center P and the internally contacting circle).

The upper and lower engaging sections 16 and 17 are both made to have a thickness t which is one-half the thickness T of the main part 15a of the frame piece 15. Therefore, when the upper engaging section 16 of one frame piece 15 and the lower engaging section 17 of another frame piece 15 are engaged together, the top and bottom surfaces of the joined portion C (see FIG. 14) become flush with the surfaces of their main parts 15a.

A projection 18 is formed at the bottom of the upper engaging section 16, while a receiving recess 19 is formed at the top of the lower engaging section 17. By engaging the projection 18 with the recess 19, the relative positions of the adjoining frame pieces 15 are fixed.

Also, a pair of parallel projections 20 are formed at the top of the upper engaging section 16, and the space between the two projections 20 serves as the support seat 12'.

Near the end of its main part 21', the support 2' has a frame-receiving recess 26 that engages with the joint C of the frame pieces 15 in the base frame 1'. From the intermediate section of the main part 21', a vertical wall 27 projects inward, i.e., toward the axis X—X passing through the center P of the base frame 1', to a distance approximately equal to the one-half of the radius R of the base frame 1. This vertical wall 27 is long, and has a shelf-like projection 28 at its lower end. The innermost edge 30 of the vertical wall 27 is formed as a wide-angled V shape. A cylindrical head 29' is formed at the top of the support 2', and the head 29' has a bolt hole 34 therethrough.

The lower vertical wall unit 3' comprises the core 31 and three equally-spaced vertical walls 32 projecting therefrom. When the lower vertical wall unit 3' is placed on the shelf-like projection 28 of the support 2', the external surface 37 of the vertical wall 32 comes in contact with the internal surface 30 of the vertical wall 27 projecting from the support 2'.

To be more precise, the vertical wall 32 of the lower vertical wall unit 3' projects outward from its core 31, to a distance approximately equal to the half of the radius R of the base frame 1'. Further, the external edge 37 of the vertical wall 32 has an externally projecting V shape, so that it engages with the internal edge 30 of the support's vertical wall 27.

The shelf 4' is substantially regular-hexagonal, and has such a size as to contact the internal edge 30 of each support's vertical wall 27.

The upper vertical wall unit 5' is identical with the lower vertical wall unit 3' in shape. The ceiling plate 6' is substantially regular-triangular, comprising three pieces 60. At its external apex, each piece 60 has a receiving section 62' with an opening 63' to receive the support head 29'.

The ceiling plate 6' is fixed by a holding member 13 that comprises three holding plates 70. Each holding plate 70 has an upper engaging section 73 at one end and a lower engaging section 74 at the other, and a hole 75 or 76 (identical with the support head 29' in shape) is made in each engaging section to receive the support head 29'.

The above-described elemental members are assembled together as follows: the frame-receiving recess 26 of the support 2' is fitted from inside to the support seat 12' (the frame piece joint C) of the base frame 1', thus erecting the three supports 2' thereon at equal intervals. Then, the vertical walls 27 and shelf-like projections 28 of the individual supports 2' face inward. Into the space surrounded by the vertical walls 27 is slid the lower vertical wall unit 3', the shelf plate 4' and the upper vertical wall unit 5' in that order, in contact with the internal edges 30 of said vertical walls 27. They are received by the shelf-like projections 28.

Then, the three ceiling plate pieces 60 are mounted so as to cover the top of the vertical walls 27 of the supports 2' and the upper vertical wall unit 5'. The ceiling plate holding member 13, comprising the three holding plates 70, is placed on the ceiling plate 6'. Each ceiling plate piece 60 and holding plate 70 are engaged with the support head 29', then a bolt 93 is passed through the hole 34 in the support head 29 and fastened with a nut 94. By this means, the piece 60 and holding plate 70 are prevented from disengaging.

Figure 17:
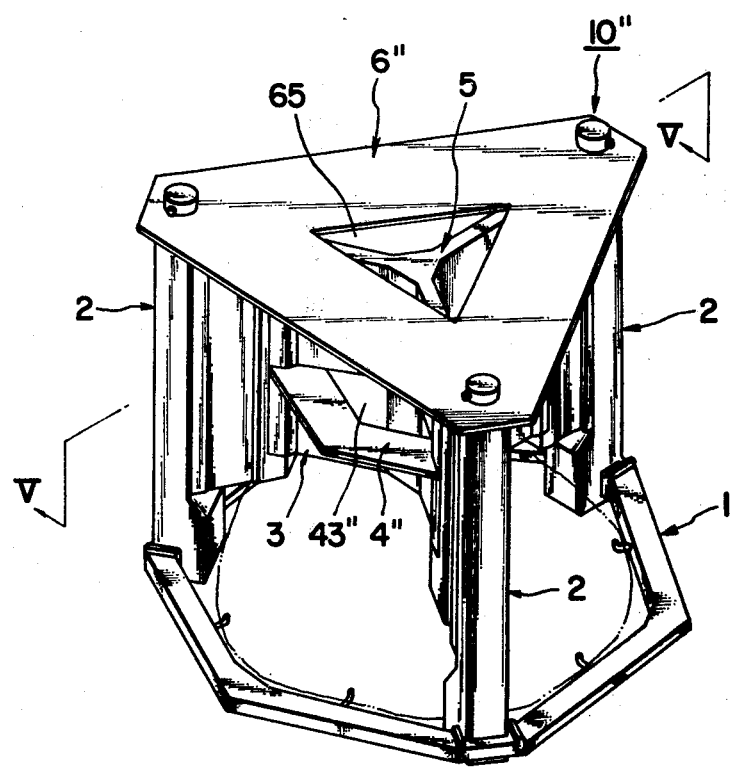
FIG. 17 is a perspective view of yet another fish-gathering block embodying this invention.
Figure 18:
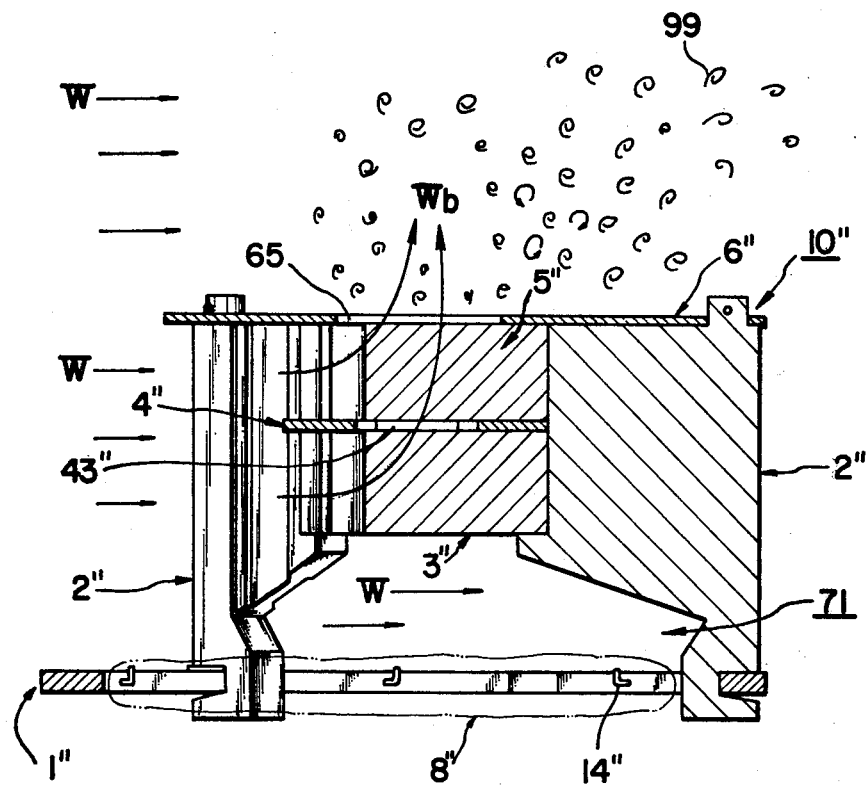
FIG. 18 is a cross-sectional view taken along the line V—V of FIG. 17.

FIGS. 17 and 18 illustrate an embodiment of a block 10'' wherein a current flow-through opening 65 is formed in the ceiling plate 6''. On striking the fish-gathering block 10'', a portion of the current Wb flows upwardly through the opening 65 to a position above the ceiling plate 6'', where it runs against the current W to generate a whirlpool or turbulence 99 above the fish-gathering block 10''. Many microorganisms and fingerlings gather around the fish-gathering block 10''. Thus, when the current Wb flows upward through the opening 65, they are also blown upward into the whirlpool or turbulence 99 above the block 10'', thereby attracting large fishes that eat such microorganisms and fingerlings. In this embodiment, the shelf 4 also has an opening 43'', with the current passing through this opening furthering the aforementioned action.

Now the favorable results which can be obtained from this invention will be described in the following:

(1) Since the flow-through opening 71 is provided above the base frame 1, 1' or 1'', the current (i.e., the deflected current Wa) no longer excavates the earth and sand around the base frame when the fish-gathering block has sunk in the sea-bottom. This prevents excessive sinking or overturning of the fish-gathering block.

(2) Since the vertical walls are radially disposed and topped with the ceiling plate 6, 6' or 6'', the current is effectively checked and, thus, produces a large whirlpool. This extensive whirlpool behind the fish-gathering block is effective for gathering fishes.

(3) Such elemental members as the base frame, vertical supports, vertical wall units, shelf and ceiling plate are made in separate sections so as to be assembled at the installation site. This lowers the entire fish-gathering installation cost by eliminating large molds, decreasing transportation cost, and so on.

(4) Attachment of the stone-filled net bag 8 in the base frame prevents the sinking or overturning of the block even on the soft sea-bottom.

(5) Engagement of the frame-receiving recess 26, formed at the lower end of the support, from inside with the support seat 12 of the base frame, dispenses with such fastening members as the bolts 91.

(6) The division of the base frame or ceiling plate into sections facilitates their manufacture and transportation.

(7) Formation of the integral vertical wall 27 on one side of the support reduces the size of the upper and lower vertical wall units.

(8) Provision of the flow-through opening 65 in the ceiling plate permits the current Wb to flow through yet upwardly, thereby increasing the fish-gathering effect of the block.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fish-gathering block comprising a base frame and a plurality of supports erected thereon, said supports supporting an upper structure, at least one vertical wall unit disposed within the region between said supports and positioned vertically between said upper structure and said base frame, and means supporting said wall unit in vertically spaced relationship above said base frame so as to leave a current flow-through space above said base frame and below said wall unit.

2. A fish-gathering block comprising a base frame, a plurality of separate supports erected on and projecting upwardly from the base frame, a ceiling means spaced upwardly above the base frame and mounted on the supports adjacent the upper ends thereof, a plurality of vertically-stacked vertical wall units positioned between the base frame and the ceiling unit, each wall unit having a plurality of vertical walls, and substantially horizontal shelf means interposed between the lowest wall unit and said ceiling means, said lowest wall member being held by said supports so as to leave a current flow-through space above said base frame and below the lowermost wall unit.

3. A fish-gathering block according to claim 2, wherein a weight-filled net bag is attached to the inside of the base frame to prevent the floating of the sea-bottom earth and sand.

4. A fish-gathering block according to claim 2, wherein a vertical flow-through opening means is formed in the shelf means.

5. A fish-gathering block according to claim 2, wherein the support and the base frame are fastened together by engaging a receiving recess, which opens outwardly at the lower end of the support, with a support seat on the base frame.

6. A fish-gathering block according to claim 2, wherein the base frame is made up of a plurality of frame pieces.

7. A fish-gathering block according to claim 2, wherein the ceiling means is made up of a plurality of ceiling plate pieces.

8. A fish-gathering block according to claim 2, wherein the support is integrally formed with a vertical wall extending from one side thereof to a distance approximately equal to half of the radius of the base frame, said support being erected on said base frame so that said vertical wall faces toward the axis thereof.

9. A fish-gathering block according to claim 2, wherein vertical flow-through opening means is formed in the ceiling means.

10. A fish-gathering block according to claim 2, wherein each wall unit comprises a central post-like core which extends vertically substantially along the central vertical axis of the block, and said plurality of vertical walls being fixed to said core in angularly spaced relationship therearound and projecting radially outwardly from said core toward the respective supports.

11. A fish-gathering block according to claim 2, wherein each of said supports comprises a vertically elongated post-like member which has the lower end thereof fixed to said base frame, said supports projecting upwardly from said base frame in angularly spaced relationship, said wall units being positioned in the region bounded by said plurality of supports, each said wall unit including a central post-like core which extends vertically and has said plurality of vertical walls fixed thereto and projecting radially outwardly therefrom, said plurality of vertical walls being spaced circumferentially around said core and projecting radially outwardly therefrom toward a respective support, the radially outer edge of each said wall being engaged with a respective one of said supports.

12. A fish-gathering block according to claim 11, wherein each of said supports has a vertically extending channel-like slot formed therein and extending longitudinally thereof, and the radially outer edge of each said wall being vertically slidably guided within one of said channel-like slots.

13. A fish-gathering block according to claim 11, wherein said horizontal shelf means comprises a substantially horizontal plate-like member which is vertically positioned between a pair of adjacent wall units and extends horizontally between a pair of adjacent said vertical walls.

14. A fish-gathering block according to claim 11, wherein at least one of said shelf means and ceiling means is provided with vertical opening means formed therein.

15. A fish-gathering block according to claim 11, wherein said base frame is of a ring-like construction, and separable weight means attachable to said block and positionable inside said ring-like base frame for preventing floating of the sea-bottom earth and sand located within the base frame.

16. A fish-gathering block according to claim 11, wherein there are at least three of said supports mounted on and projecting upwardly from said base frame at spaced intervals therearound, and each of said wall units having a number of said vertical walls equal to the number of said supports.

17. A fish-gathering block comprising a substantially flat and horizontally enlarged base frame adapted to be deposited on the sea-bottom, a plurality of separate upright supports removably attached to said base frame and projecting upwardly therefrom, said supports being positioned in an angularly spaced-apart relationship, a top wall structure supported on said upright supports adjacent the upper ends thereof so as to be vertically spaced upwardly above said base frame, said top wall structure extending across the region defined between said supports, and at least one vertical wall unit disposed within the region between said supports and positioned vertically between said top wall structure and said base frame, said vertical wall unit including a plurality of vertical walls with a different one of said vertical walls being connected to and projecting inwardly into the region from each of said upright supports, whereby said vertical walls in cooperation with said supports define a plurality of spaces within said region which are bounded by said vertical walls and open sidewardly of the block between a pair of adjacent upright supports, and means supporting said wall unit in vertically spaced relationship above said base frame so as to leave a current flow-through space above said base frame and below said wall unit.

* * * * *